Jan. 2, 1945.  B. P. LAWSON  2,366,269
MECHANISM FOR FORMING SLIDERS
Filed Nov. 5, 1942  8 Sheets-Sheet 3

INVENTOR.
Birdsall P. Lawson
BY
ATTORNEY

Jan. 2, 1945.   B. P. LAWSON   2,366,269
MECHANISM FOR FORMING SLIDERS
Filed Nov. 5, 1942   8 Sheets-Sheet 4
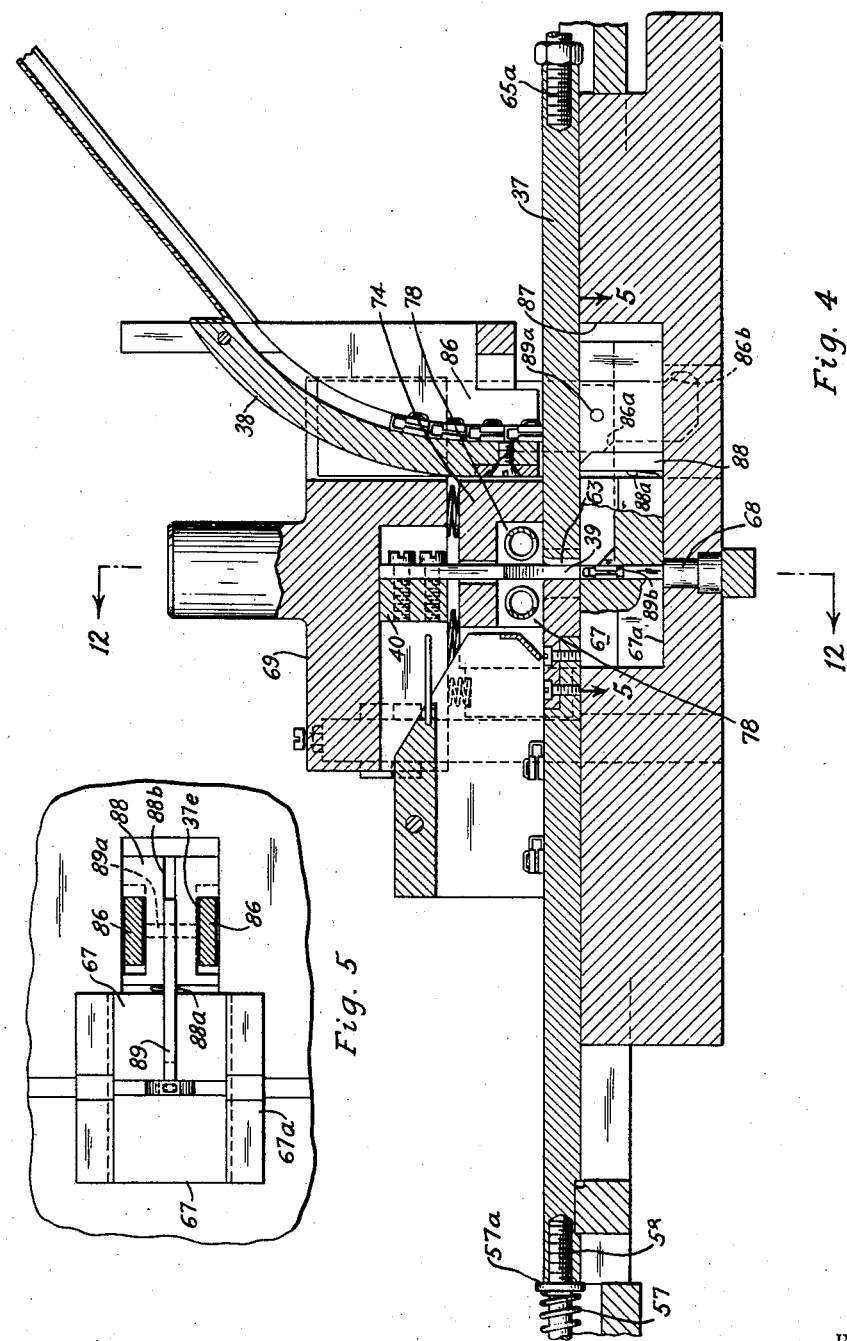
INVENTOR.
Birdsall P. Lawson
BY
ATTORNEY

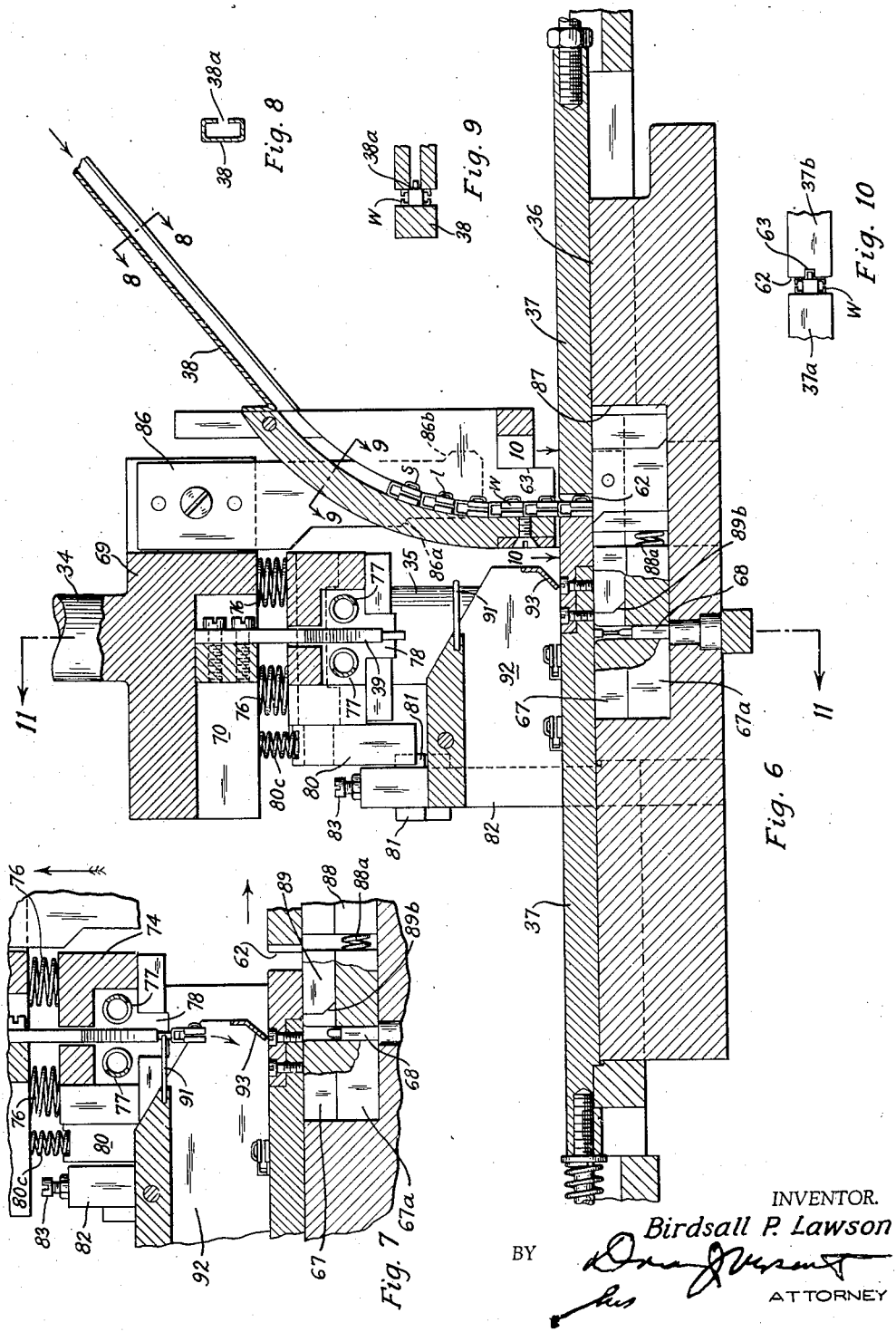

Jan. 2, 1945.　　　　B. P. LAWSON　　　　2,366,269
MECHANISM FOR FORMING SLIDERS
Filed Nov. 5, 1942　　　8 Sheets-Sheet 6

INVENTOR.
Birdsall P. Lawson
BY
ATTORNEY

Jan. 2, 1945.   B. P. LAWSON   2,366,269
MECHANISM FOR FORMING SLIDERS
Filed Nov. 5, 1942   8 Sheets-Sheet 7

INVENTOR.
Birdsall P. Lawson
BY
ATTORNEY

Jan. 2, 1945.    B. P. LAWSON    2,366,269
MECHANISM FOR FORMING SLIDERS
Filed Nov. 5, 1942    8 Sheets-Sheet 8
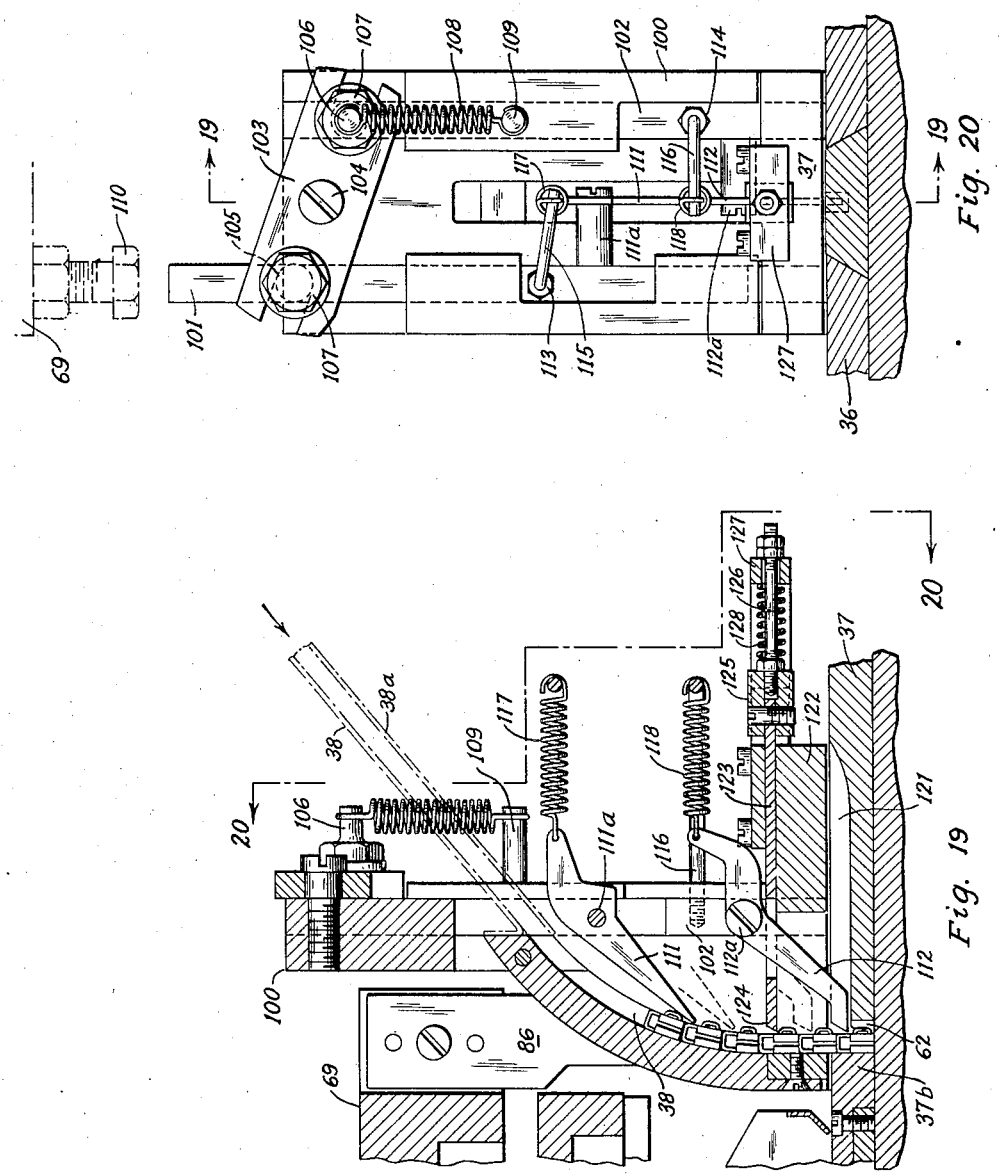
INVENTOR.
Birdsall P. Lawson
BY
ATTORNEY Patented Jan. 2, 1945

2,366,269

UNITED STATES PATENT OFFICE 2,366,269

MECHANISM FOR FORMING SLIDERS

Birdsall P. Lawson, Providence, R. I., assignor to Pilling Chain Company, Providence, R. I., a corporation of Rhode Island Application November 5, 1942, Serial No. 464,687

20 Claims. (Cl. 153—13)

This invention relates generally to the manufacture of so-called sliders as employed in slide fasteners and is more particularly directed to a means or mechanism for reinforcing or stiffening the neck or web portion which connects the wings thereof, to render the slider more resistant to the expanding and contracting forces to which it is subjected in various phases of its use.

As is well-known, the sliders are produced of strip metal and embody two complementally formed wing sections connected by a web portion commonly termed the neck, the wing sections including side flanges which cooperate to form the necessary channels for the engagement of the slider with the interlocking elements of the fastener. Since the sliders are subjected to severe stresses in use, which tend to spread or separate the wings, as when a fastener is closed under strain, and to compress it, as where a slider is passed through a wringer or ironer, in the laundering of the article to which the fastener is attached, the slider must possess the requisite rigidity to resist these deforming forces if it is to remain serviceable.

Various means have been resorted to for stiffening the slider, that which has been found to be most satisfactory comprising a V-shaped reinforcement formed in the neck-defining surfaces of the slider. This not only serves to stiffen the slider against expansion and compression forces, but functions to provide surfaces which guide the movement of the interlockable elements of the fastener through the divergent portions of the channels formed by the opposite slider wings.

Heretofore, it has been the standard practice to form the V-shaped reinforcement in the blank of the strip metal, preliminary to the conformation of the slider therefrom, in a series of successive die operations, the reinforcement being produced in a manner similar to that followed in so-called coining processes. This, of course, necessitates the use of stock of a heavier gauge than is normally required for the slider, in order to provide for the displacement of the metal of the blank to produce the V-shaped formation and with the relatively expensive die operations involved, adds materially to the cost of the end product.

The primary object of the present invention, therefore, is to reduce the production costs of sliders for slide fasteners and at the same time, provide a slider which will have the requisite stiffness or rigidity to resist those stresses to which it may be subjected in use without deformation, the slider embodying a V-shaped reinforcement formed in the neck thereof subsequently to the completion of the shaping of the slider, in a simple die operation, thereby eliminating the relatively slow and costly coining processes now followed and obviating the use of the higher priced, heavier gauge strip material that is essential in practicing the conventional methods.

More specifically, it is an important object of this invention to provide a mechanism for performing a so-called necking step in the production of sliders, whereby the slider structure, in the zone of the neck is materially reinforced or stiffened to resist extension and compression forces to which the unit may be subjected in use, in a simple and economical operation; the slider which is otherwise completely formed being introduced to my mechanism for the deformation of the neck-defining surfaces under pressure, in a manner to produce a V or other appropriately shaped reinforcement, which will not only stiffen the unit but will serve to guide the interlockable elements of a fastener into and out of engagement, in the movement of the slider thereover.

Another object of this invention is to provide a mechanism, as aforesaid, whereby sliders as variously formed in divers die or other operations to embody a web connecting the opposite wings thereof, in the manner of the conventional slider, may be readily provided with an adequate reinforcement and rendered more durable and efficient in use; thus making it possible for the manufacturer to attain the advantages that are inherent to sliders of such reinforced type, without going to the expense of converting their equipment or re-scheduling their operations, with the attendant delays in production.

It is also an object of my invention to provide a method of reinforcing or stiffening a slider to resist extending and compressing forces, following the formation of the flanged wings thereof and the disposition of such wings in oppositely spaced relation to form channels for the reception of the interlockable fastener elements, in the completion of the slider; my method comprising the final step in the production of the unit.

Other objects and advantages flowing from the practicing of my invention will become manifest as the description proceeds.

For the purposes of this disclosure, in the accompanying drawings, I have shown a preferred embodiment of my mechanism for carrying my invention into effect, which functions to produce a V-shaped reinforcement in the otherwise completed slider. However, it will be understood that the mechanism may take other forms to meet specific requirements of production and use, within the spirit and scope of my invention. For example, in lieu of the V-shaped reinforcement, the elements which cooperate to produce it may be so formed as to produce a reinforcement of a U or other shape appropriate to the stiffening and functioning of the slider.

In the drawings—

Figure 4 is a view similar to Figure 3, showing the relative positions of the parts just after the punch has operated.

Figure 5 is a view on the line 5—5 of Figure 4.

Figure 6 is a sectional elevation of the mechanism, with the punch raised and the work-receiving recess of the table alined with the work-delivery chute.

Figure 7 is a sectional detail, illustrative of the relative positions of the parts in the upward movement of the punch.

Figures 8, 9 and 10 are respectively sectional and plan views on the lines 8—8, 9—9 and 10—10 of Figure 6.

Figures 11, 12:
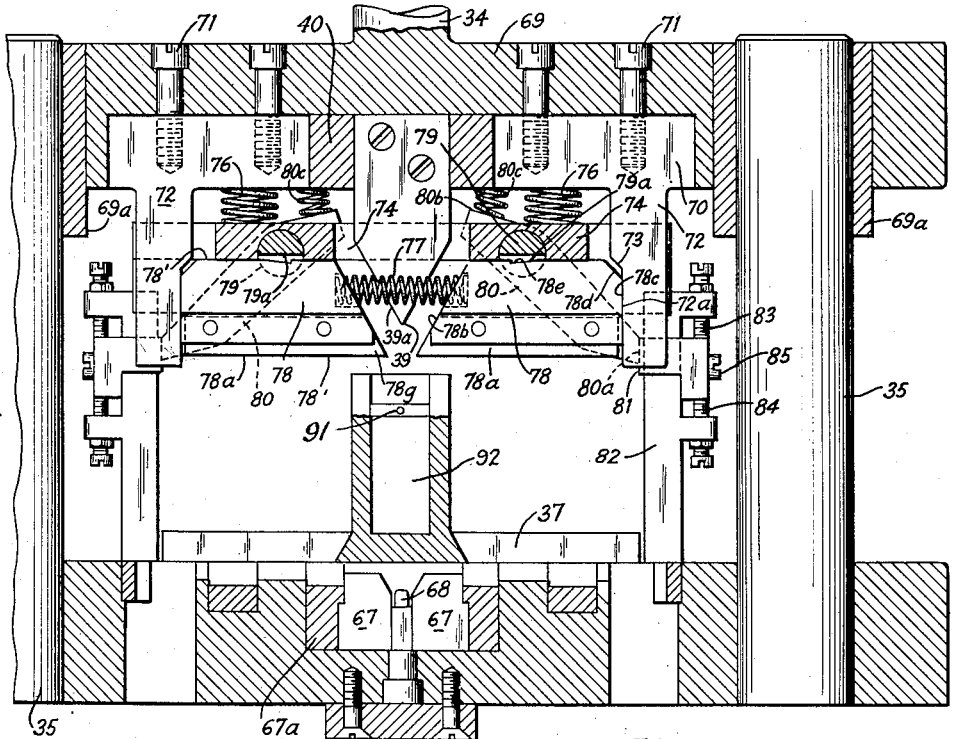

Figure 11 is an enlarged sectional detail on the line 11—11 of Figure 6.

Figure 12 is an enlarged cross-sectional detail on the line 12—12 of Figure 4.

Figure 3:
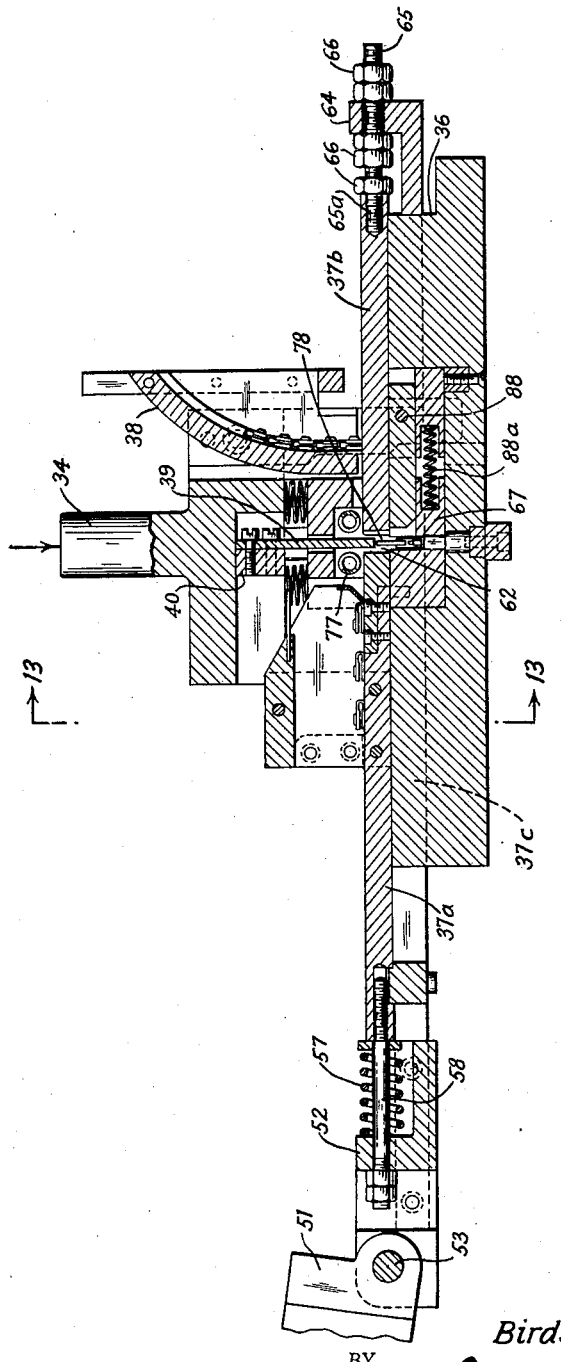
Figure 3 is a longitudinal section on the line 3—3 of Figure 2, with the reciprocable table in the punch operating position.
Figure 13:
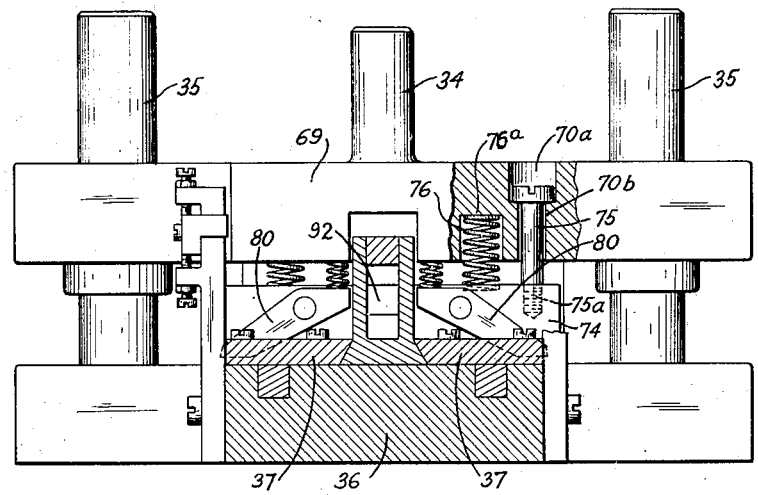

Figure 13 is a side elevation, partly in section, on the line 13—13 of Figure 3.

Figures 14, 15, 16 and 17 illustrate the successive steps of the reinforcement-forming operation.

Figures 14, 15, 16:
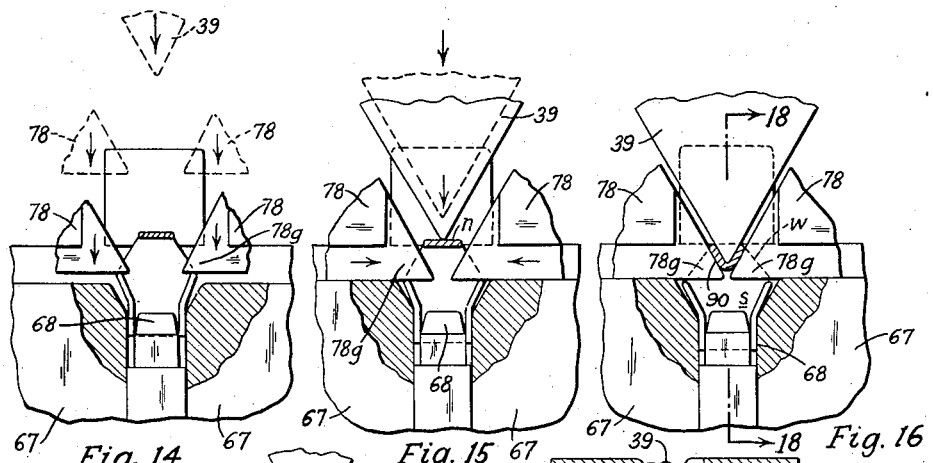
Figure 18:
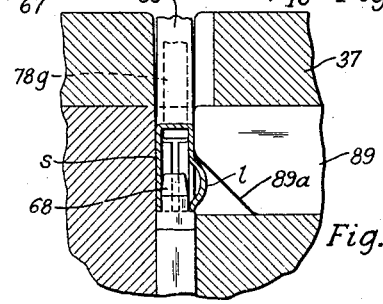

Figure 18 is a vertical sectional view on the line 18—18 of Figure 16, showing the cooperating male and female die-forming elements in their ultimate reinforcement-forming positions.

Figure 19 is a vertical sectional view of a modified form of work-feeding mechanism, on the line 19—19 of Figure 20; and Figure 20 is a view in elevation taken from the line 20—20 of Figure 19.

Referring now to the drawings in detail, in which like characters of reference are employed to designate similar parts in the several views, the machine or mechanism conforms generally to the conventional power press, including a main frame 30 supported from the standards 31, the usual bed 32 and a head 33, with which the mechanism for concurrently reciprocating the central slide or so-called ram 34, relative to the outer guides 35, is associated.

Fixed to the bed 32 is a base 36, upon which is mounted slides 37a, 37b, connected for relative and conjoint movement, as hereinafter described, these slides constituting a table, generally indicated at 37, reciprocable upon said base to receive the work from the chute 38 and transfer it to the die position for the necking operation in a continuing movement in one direction. Following the withdrawal of the work from the die position, the table moves in the opposite direction to receive another piece of work for subsequent delivery to the die position, the reverse directional movements of the table and the period of dwell of the table for the performance of the punching operation and effecting the withdrawal of the work from the die position, being in timed relation to the cooperating movements of the ram or central slide 34 which carries the male die 39, mounted in the punch holder 40 rigid with said ram or slide 34, as and in the manner hereinafter described.

As herein shown, the effort for effecting the movement of the table 37 to and from the die position, in timed relation to the reciprocation of the ram or central slide 34 is derived from the drive shaft 41 journaled in the head 33 of the machine, a slotted crank head 42 excentrically mounted on said shaft, as at 42a, being connected to the lever 43 by the rod 44, to impart motion to a second lever 45 connected to the table 37, the two levers 43 and 45 being keyed to the shaft 46 mounted in a bearing on the bracket 47 fixed to the machine frame 30. As will be noted, these levers are relatively angularly disposed for functioning in the manner of a bell-crank lever. The free end of the lever 45 is pivoted, as at 48, to the block 49 slidable upon the rod 50 rigid with the fitting 51, the latter being pivotally mounted in the outer end of the slide 52 mounted on the pin 53. A spring 54 interposed between the block 49 and the nuts 55 threaded on the outer end of said rod 50, normally acts to urge said block into engagement with the rod-embracing abutment 56 on said fitting 51. A stud 58 threaded into the adjacent end of the slide 37a, as at 58a, and extending through a suitable bearing dependent from the slide 52, is embraced by a spring 57 abutting upon the stops 57a, this spring functioning to maintain the slide 37a in spaced relationship to the opposed end of the slide 37b of the table, as may be predetermined by the appropriate adjustment of the nuts 59 on said stud, as will become evident. An arm 60, extending outwardly from the fitting 51, carries a spring 61 dependent from its outer end, for connection to a bracket (not shown) bolted to the machine frame below the level of the bed 32, to exert a continuous downward pull upon said arm 60 and control the movement of the fitting 51 on the pin 53, to conform to the radius differentials in the oscillation of the lever 45.

Figure 1:
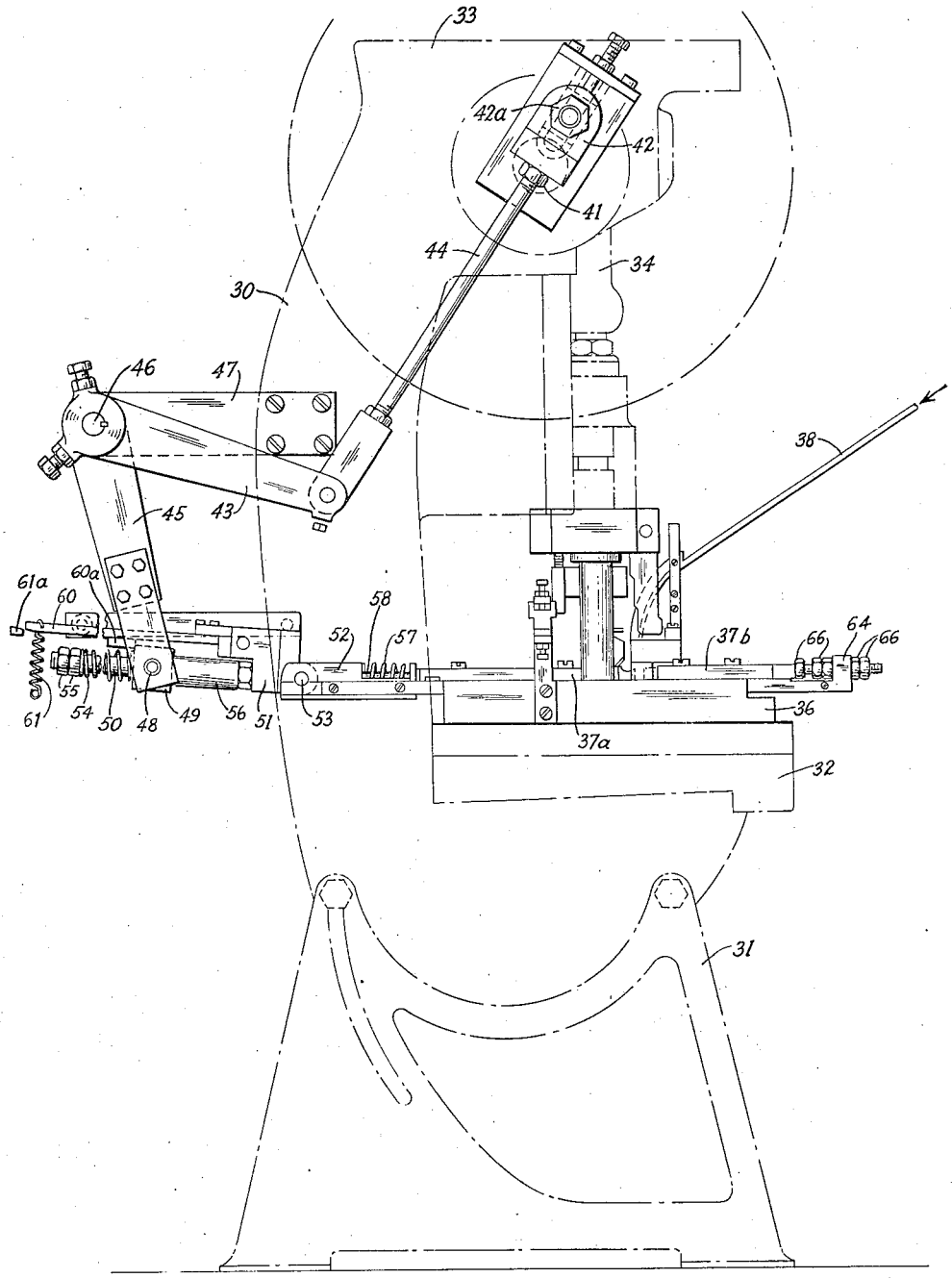
Figure 1 is an end elevation of my mechanism.

The opposed ends of the table-forming slides 37a, 37b, are conformed to cooperate in the formation of a slot 62 in the table 37, which is adapted to receive a slider, indicated at s, from the work-delivery chute 38, for transfer to the die position, one of the walls of said slot being provided with a groove 63 to accommodate the lug l of the slider, this groove being adapted to register with a complemental groove 38a extending from end to end of the chute 38, when the slot 62 of said table 37 is alined with the chute to receive the lowermost slider therein. (See Figs. 6, 8, 9 and 10.) It will be evident that the sliders are introduced to the chute 38 for progression therethrough, with their lugs l disposed within the chute groove 38a, for successive entry into the table slot 62, with the lug of the entered slider in the groove 63 of the table slot and the lower or bottom edges of the wings w bearing upon the opposed surface of the base 36, to traverse the same in the transfer of the slider to the die position, as the table 37 is urged to the left, as viewed in Figure 1, in response to the oscillation of the lever 45 in a like direction, the relative spacing of the slot-forming faces of the table slides 37a, 37b, providing for the free entry of the slider s within the slot 62, irrespective of possible relative divergence of the lateral surfaces of the slider. In the movement of the table assembly to locate the slot 62 in work-receiving position, the effort is transmitted from the arm 45, rocking to the right, and through the block 49 to the slide 52 to effect the conjoint movement of the table-forming slides for disposing the slot 62 in alinement with the work-delivery chute 38 for the reception of a slider therefrom. As the slider is entered in the slot 62, the continuing movement of the slide 52 to the right permits the spring 57 to function to urge the slide 37a toward the slide 37b to cooperate therewith to compress the divergent lateral surfaces of the slider disposed within the area of the slot 62 into parallel relationship. In the ensuing movement of the table assembly to the left, to locate the work at the die position, it will be manifest that this movement occurs in response to the actuation of the lever 45 to the left, the block 49 moving with said lever engaging the stop 60a on the aforesaid arm 60, the stop being disposed in the path of movement of said block by the action of the spring 61. As the stop 60a is thus engaged by the block 49, the continuing arcuate movement of the lever 45 will effect the positive actuation of the table 37 from the work-receiving position to the die position. At that point in the cycle, in which the movement of the table to the left locates the work at the die position, the arm 60 abuts upon the stop 61a to be deflected upward in opposition to the spring 61, this movement of the arm 60 effecting the disengagement of the stop 60a from the block 49, permitting the block to traverse the rod 50 in opposition to the spring 54, the expansion of the spring 57 coincidental to the movement of the work to the die position, effecting the separation of the work-engaging surfaces of the slot 62 formed by the opposed ends of the slides 37a, 37b, to permit the slider to be moved from between the table slides at the die position, as will become evident. Obviously, during the continuing movement of the block 49 in opposition to the spring 54 to compress the latter, and its opposite movement along the rod 50 to engage the abutment 56 and initiate the movement of the table toward the work-receiving position, the lever 45 is non-effective relative to the table assembly and provides for the dwell of the table at the die position, for the performance of the necking operation and withdrawal of the necked slider from the die position. As the block 49 traverses the rod 50 under the influence of the lever 45, rotating to the right to engage the abutment 56, as will be apparent, the spring 54 will expand in following engagement, the arm 60 being disengaged from the stop 61a and, under the influence of the spring 61, assuming the position shown in Figure 1, in which the stop 60a carried by said arm is again imposed in the path of movement of the block 49 to the left for the reverse directional movement of the table assembly, as heretofore described.

Figure 2:
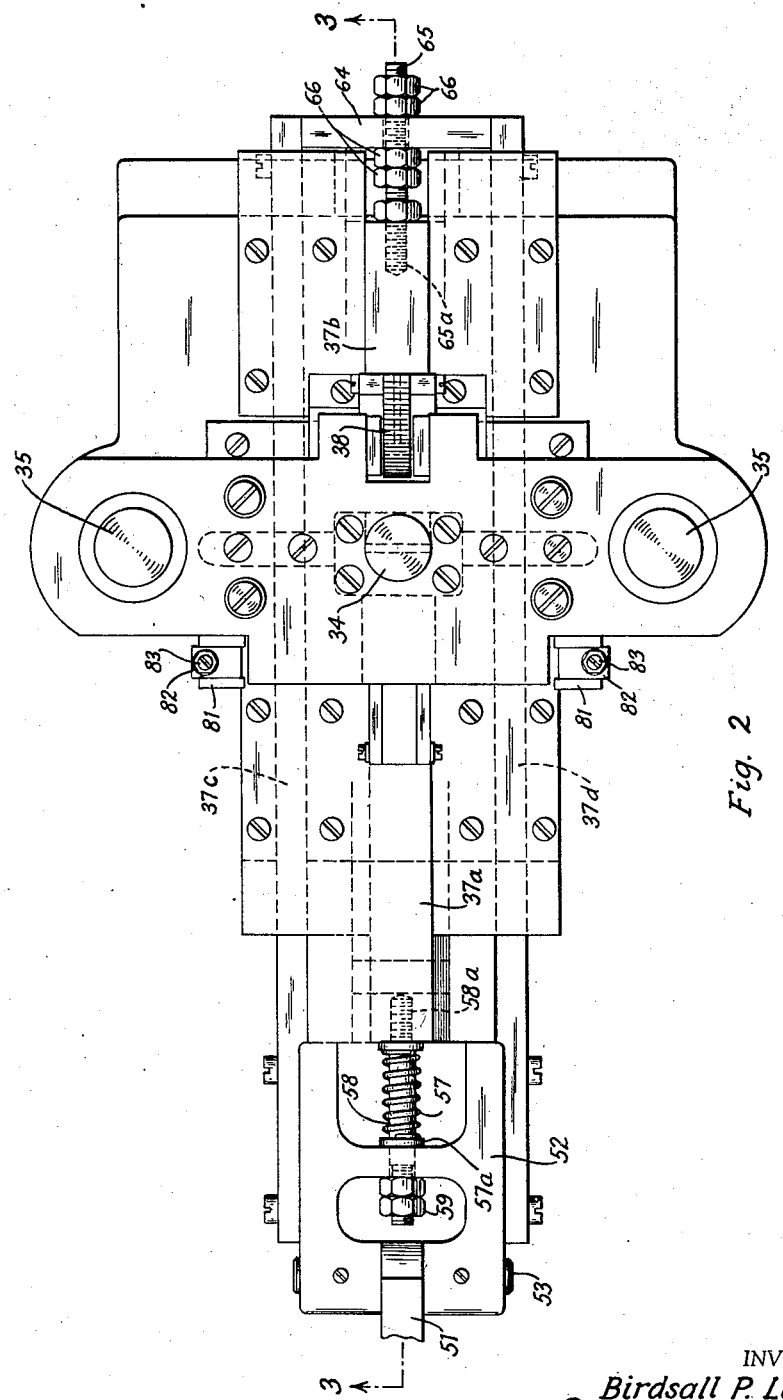
Figure 2 is a top plan view of the structure of Figure 1.

To limit the movement of the table assembly to the left or to the die position, and insure complete registration of the slot 62 with the die elements at the die position, a bracket 64, connected to and spanning the outer slide rods 37c, 37d (Fig. 2), is bored to receive the end of the stud 65 threaded into the adjacent end of the slide 37b of the table assembly, as at 65a, the slide 37b being adjustable relative to the outer slides for positive reciprocation therewith, relative to the base 36, through the medium of the nuts 66 engaged with said stud 65.

Mounted beneath the table 37, at the die station or position, is a shoe 67a formed for the reception of the die section 67 which embodies an upright tongue 68 for centering the work in engagement with the die section surfaces on either side thereof, these work-engaging surfaces being complemental to the portions of the work engaged thereby, the said tongue 68 being in axial alinement with the punch or male die 39 carried by the central slide 34, the movements of the table 37 to and from the die position being synchronized with the alternate descending and rising movements of said slide, as heretofore pointed out.

The central slide 34, as clearly shown in Figures 11, 12 and 13, embodies a head 69, having the usual bearings 69a for traversing the outer guides 35, the head 69 having a fitting 70 set therein and fixed thereto by the screws 71. The aforesaid fitting 70 is provided with relatively laterally spaced dependent arms 72, in juxtaposition to said outer guides 35, each of these arms embodying a cam surface 73, an inner head 74 being suspended beneath said fitting between said arms 72 for relative vertical movement, by screws 75, threaded therein, as at 75a, the screws being axially movable within the bore sections 70a and 70b of said fitting, to provide for such vertical movement of the inner head. Expansion springs 76, positioned upon seats 76a in said fitting 70, abut upon the opposed surface of the inner head and normally function to maintain it in vertically spaced relation to said fitting 70, as shown in Figure 13, these springs serving to cushion the movement of the inner head toward the fitting 70, in the descending movement of the central slide, as will become apparent.

Slidably mounted on the inner head 74, for relatively opposite actuation transversely thereof, are a pair of T-shaped blocks 78, having projecting surfaces which cooperate in functioning as a female die, in the performance of the slider necking operation, as will be hereinafter described. These blocks 78 are preferably of the configuration shown, embodying parallel top and bottom surfaces, indicated at 78', with their opposed inner faces inclined, as at 78b, in parallelism with the opposed surfaces 39a of the tapered male die or punch 39, the outer faces of said blocks being composed of vertical sections 78c complemental to the vertical surfaces 72a of the arms 72 dependent from the fitting 70, surmounted by inclined portions 78d of the same angularity as the inclined portions of the cam surfaces 73 of said arms. The base of each of said blocks 78, is longitudinally slotted on its median line to receive a die-forming element 78a, which may be pinned or otherwise anchored therein, the straight lower edge of said element being disposed beneath the adjacent surface of the block, as shown, and forming an acute angle with the inclined inner edge of said element, in registration with the block surface 78b, to provide a surface 78g projecting beyond the contiguous surfaces of the block, which is adapted to enter beneath the neck portion of a slider, the opposed elements cooperating in supporting the engaged slider for the deformation of the neck under the impact of the punch 39, as will become evident. Normally, as shown in Figure 11, for example, the two blocks 78 are urged outwardly from their coacting positions to dispose their vertical outer surfaces 78c in engagement with the surfaces 72a of the arms 72, by springs 77 interposed between the blocks, in front of and behind the punch or male die 39.

Rockable in bearings disposed transversely of the path of movement of the blocks 78 within the inner head 74, above said blocks and in proximity to the top of said inner head, are a pair of pins 79 embodying intermediate semi-annular portions 79a, the flat surfaces thereof being adapted to engage the notches or seats 78e provided in the top surfaces of the adjacent die blocks 78. These pins 79 extend beyond the rear of the inner head 74 to receive the levers 80, rotatable therewith, the lower ends of the levers 80 being conformed, as at 80a, to engage the complemental surfaces of the stops 81. The stops 81 are carried by brackets 82 fixedly supported from the bed of the machine to the rear of the central slide assembly and in laterally spaced relation thereto, the stops being adjustable relative to the brackets by means of the cooperating screws 83, 84, and lockable in adjusted position by the set screws 85. (See Fig. 11.) The top surfaces of the levers 80, as will be noted, are chamfered or bevelled to form a nose, as at 80b, a spring 80c being interposed between the nose of each lever and a suitable seat provided in the opposed surface of the fitting 70, the springs 80c being adapted to react at a predetermined stage of the descent of the central slide to rotate or rock the levers 80 and rotate said pins 79 to engage the aforementioned flat surfaces of the semi-annular portions 79a of said pins with the notches or seats 78e of said die blocks 78.

Dependently supported from the front of the head 69 of the central slide 34, in laterally spaced relation, are a pair of arms 86 having opposite cam surfaces 86a and 86b, these arms being adapted to enter the well 87 in the base 36, to actuate the block 88 slidable therein, the descending movement of the arms impelling the block toward the die station, as the block is energized by the cam surface 86a, while in the upward movement of the arms, the cam surface 86b is effective upon the block 88 to initiate its movement in the reverse direction, the movement of the block in the latter direction being completed in response to the expansion of the spring 88a interposed between the forward end of the block 88 and the mated die sections 67 in the shoe 67a. The sides of the table 37 are recessed, as at 37e, to provide for the vertical movement of the arms 86 to and from their block-engaging position, these recesses being alined with said arms when the work-receiving slot of the table is at the die position.

As will be noted, especially from Figure 5, the block 88 is longitudinally slotted, as at 88b, to receive the work-engaging bar 89 to which it is connected by the pin 89a, the movement of the block 88 in the descending movement of the arms 86 urging the bar 89 toward the work to engage the nose of said bar therewith, the nose being undercut, as at 89b, to clear the juxtaposed lug of the slider. Thus, the slider is positively supported upon the die sections 67 against forward and backward, as well as lateral displacement or distortion, under the necking tool impact, the aforesaid elements 78a of the die blocks 78 functioning to support the web portion of the slider between the wings thereof, for the necking operation. Obviously, the cooperation of these several work-engaging surfaces in the manner described, insures a high degree of efficiency in operation and eliminates waste, which flows from the distortion of inadequately supported work, in punching operations, especially where light gauge material is being processed, as in the production of fastener sliders.

In the operation of the mechanism, assuming that the central slide 34 is raised and the slot 62 of the table is in registration with the end of the work-delivery chute 38 to receive a slider s, it will be evident that as the slide 34 descends, movement of the table 37 toward the die position will be initiated in response to the actuation of the lever 45, in the clockwise rotation of the drive shaft 41, in the manner heretofore described.

As the central slide continues its descent, the movement of the table to locate the work engaged in the slot 62 thereof at the die position likewise continues, as explained, the operation of the table and slide 34 being so timed that when the work disposed in said slot 62 reaches the die position, the die blocks 78 carried by the inner head 74 suspended from the head 69 of the central slide are in proximity to the table, the nose of the male die 39 being in spaced relation to the opposed surface of the neck of the slider approximately as shown in full lines in Figure 14, the initial relative disposition of the punch 39 and the die blocks 78 being indicated in dotted lines in said figure. In the continuing downward movement of the inner head 74, the thrust of the compression springs 76 is effective to cause the dependent projecting surfaces 78a of the die blocks 78 to contact with and press upon the upper edges of the slider wings w to displace the slider from the table slot 62, and locate it in association with the die sections 67 and the tongue 68, the initiation of the compression of the springs 76, between the head 69 and the inner head 74, causing the cam surfaces 73 of the arms 72 to become effective upon the surfaces 78d of the blocks 78 to actuate the blocks toward the work, as the base edges of the die-forming elements 78a, carried by the blocks 78, enter the slot 62 in the table, to abut upon the opposed surfaces of the die sections 67, and cooperate in the formation of a pocket into which the neck of the slider will be thrust in the functioning of the punch 39, when the latter impinges upon the opposed surface of the slider neck. (See Figure 15.) In this position of the head assembly components, the levers 80 have become disengaged from their stops 81 and are free to respond to their actuating springs 86. Also, the slide 88, in the well 87 has been engaged by the cam surfaces 86a of the arms 86 to urge the nose of the work-engaging bar 89 into close association with the slider s, in the manner previously explained.

As the deforming pressure becomes effective on the neck n of the slider s, in the continued downward movement of the punch 39, the springs 76 are completely compressed, as shown in Figure 12, the straight portions of the cam surfaces of the arms 72 having entered upon the straight end surfaces 78c of the two blocks 78, to urge said blocks to their ultimate relative positions, with their female die-forming surfaces 78g disposed beneath the web forming the neck of the slider, to cooperate with the male die 39 in the deformation of the web, and produce a V-shaped indentation, as indicated at 90 in Figure 16. As will be noted from the latter showing, the block surfaces 78g cooperate with the entering end of the male die 39, similarly to a female die, in the formation of the V-shaped reinforcement.

As the blocks 78 are urged into their ultimate work-engaging positions, in opposition to their springs 77, as just described, the levers 80, under the influence of their springs 80c, rock the pins 79 on which they are mounted to cause the flat surfaces of the semi-annular portions 79a of said pins to engage with the notches or seats 78e of said blocks and restrain said blocks from relative opposite movement under the influence of their said springs 77.

Figure 17:
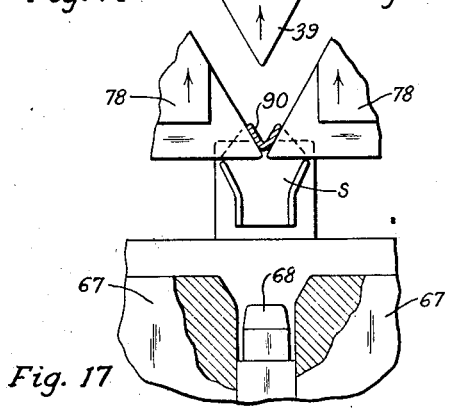

Upon the completion of the necking step, the initiation of the upward movement of the central slider 34 and the punch 39, effects the withdrawal of the punch from the work, the surfaces 78g of the blocks 78 remaining engaged therewith under the locking action of the levers 80, effective upon said blocks, as just described, the blocks remaining in the position shown in Figure 16 until the load of the inner head is transferred to the screws 75, when it rises with the slide assembly, the work still engaged by the surfaces 78g of the blocks 78 being withdrawn from its position between the die sections 67, as shown in Figure 17, the work having been released by the bar 89, in the manner heretofore described, concurrently with or just prior to the initiation of the upward movement of the inner head and the supported blocks 78. At this stage of the ascent of the central slide 34, the lever 45 becomes effective upon the table 37 to displace the work-receiving slot 62 from the die position in the reverse movement of the table, the blocks 78 continuing to rise with the inner head 74 in gripping engagement with the V-neck slider, until the lower ends of the levers 80 impinge upon the stops 81, the resulting rotative movement of said levers in opposition to their springs 80c dislocating the flat surfaces of the semi-annular portions 79a of the pins 79, from the seats or notches 78e of the blocks 78, to permit the springs 77 to expand and oppositely actuate said blocks to release the work from the surfaces 78g thereof. Simultaneously with the release of the work by the surfaces 78g of said blocks 78, a finger 91, projecting horizontally from the top of the take-off chute 92 carried by and movable with the table 37, contacts with the work to deflect it downwardly and inwardly of the apron 93, for deposit upon the table surface to be fed through the take-off chute to the removal position, in the reciprocatory movements of said table.

The upward movement of the slide 34 continues, of course, until the head assembly elements assume approximately the positions shown in Figure 11, when the work-receiving slot 62 of the table 37 is again located in registration with the work-delivery chute 38, for a repetition of the operation just described.

In Figures 19 and 20, I have shown a modified form of work-delivery chute, in which the progression of the sliders to discharging position is mechanically controlled, in lieu of permitting them to gravitate to such position, as in the form of chute shown in the preceding figures, the mechanism for controlling the slider movement operating in timed relation with the movements of the slide 34 and the table 37, the chute corresponding to that of the preceding figures.

A frame member 100 rigidly supported from the aforesaid base or gib 36 and straddling the table 37, in advance of the lower terminal of the chute 38, is provided with bearings for the slides 101 and 102, which are vertically actuatable therein, in response to the rocking of the lever 103, fulcrumed on said frame member at 104, the ends of the lever being bifurcated for connection to the pins 105, 106, on the respective slides by the nuts 107. A tension spring 108 connects the pin 106 of the slide 102 to a fixed pin 109 on the frame member 100, as shown in Figure 19. An adjustable actuator, or plunger 110 carried by the head 69 or other suitable part of the central slide assembly of the machine, is alined with the end of the slide 101.

Each of the slides 101 and 102 carries a lever for engaging the sliders entered in the chute 38 to control their progression therethrough and their successive delivery to the slot 62 of the table 37, the lever 111 being pivotally mounted on the inner face of the slide 101, as at 111a, while the lever 112 is similarly mounted on the opposite surface of the slide 102, as at 112a. Fixed to the surfaces of the respective slides 101, 102, at a right angle to those from which the levers 111, 112 are supported, as by the nuts 113, 114, are angle bolts 115 and 116, the offset end of the bolt 115 being connected to the end of the lever 111 by a spring 117, while the offset end of the bolt 116 is connected by a similar spring 118 to the lever 112, the ends of the levers to which the respective springs are attached being above the pivotal mountings of the levers, with the angle bolts located approximately in the plane of the ends of the levers to which the respective springs 117 and 118 are connected. As will be noted, the said springs 117 and 118 normally function to urge the free ends of the levers 111 and 112 into contact with the sliders within the chute 38, the levers projecting through the slot 38a thereof, to control the progression of the sliders toward the lowermost position to exit from the chute into the slot 62 of the table 37, by which the slider is conveyed to the die position, as heretofore described. As will be evident, the levers are oscillated on their pivots in the alternate reciprocatory movements of the slides 101 and 102, the downward movement of the slide 101, as plunger-actuated, producing an upward movement of the opposite slide 102, in response to the rocking of the lever 103, the subsequent downward movement of the latter slide, under the influence of the spring 108, actuating the slide 101 in the direction of the plunger 110.

Mounted in the frame member 100, is a block 122 to form a bearing for the slide plate 123 having a nose 124 formed to enter the slot 38a of the chute 38, the outer end of the slide having a head 125, carrying a bolt 126 slidable within the bracket 127 rigid with the bearing block 122, a spring 128 being mounted on said bolt, between said bracket and the head of said slide, it being obvious that the slide is adapted to yield as the lugs of the sliders abut upon the nose 124 thereof which is disposed in the path of movement of the lugs in the downward progression of the sliders through the chute, as hereinafter explained. However, by appropriately adjusting the tension of the spring 128, provision may be made for the slide 123 to function as a detector of oversize or deformed sliders which may be inadvertently introduced to the chute 38, it being evident that the spring 128 may be adjusted also for the operation of the slide plate 123 in conjunction with a series of sliders of any uniform size which the chute 38 may accommodate.

In the operation of the structure of Figures 19 and 20, assuming that the slot 62 of the table 37 is at the die position and the ram is descending, as the ram reaches its lowermost position, the plunger 110 engages the opposed end of the slide 101 to thrust it downwardly, the slide 102 moving in the opposite direction. Likewise, the lever 111 moves downwardly, while the lever 112 moves upwardly with the slide 102, it being noted that at this point in the operation of the mechanism, the slide 37b of the table assembly is positioned beneath the delivery end of the chute 38. In the progression of the ram upwardly, the plunger 110 is disengaged from the end of the slide 101, the action of the spring 108 on the bifurcated lever 103, tending to move the slide 101 upwardly. However, at this point a slider has been thrust past the bevelled end of the slide 124, as a result of the downward actuation of the lever 111, and under the bevelled end of the lever 112. Now, as the action of the spring 108 becomes effective, the resulting downward movement of the slide 102 causes the nose of the lever 112, in engagement with the lug of the slider, to urge the slider downwardly and firmly upon the opposed surface of the table slide 37b. The continuing cycle of the machine operation again locates the slot 62 of the table 37 in registration with the delivery end of the chute 38 and since there is no obstruction to the downward movement of the slider now in lowermost position, it is urged into the slot 62 between the table slides 37a, 37b, the lever 112 functioning to force the slider into said slot. This downward movement of the lever 112, in effecting the transfer of the slider to the slot 62, is arrested as the lever engages with the flat surface of the longitudinal cut-out 121 on the table 37, the slider s being thus freed of the lever 112, to be gripped between the opposed slot-forming surfaces of the table slides 37a, 37b, as previously described. As will be evident, as the lever 112 snaps downwardly, the lever 111 yields and moves upwardly over the lug of the next succeeding slider and assumes a position relative thereto, to forcibly impel it past the bevelled end of the slide 124, in the succeeding downward actuation of the slide 101, for engagement by the nose of the lever 112, in the manner heretofore explained.

From the foregoing, it will be manifest that I have provided a highly efficient and practical mechanism for necking fastener sliders in which the usual waste resulting from such operations, as now performed, is eliminated, the coacting elements of the mechanism functioning in timed relation to admit of the high speed production that is essential to the economical production of fastener sliders.

While I have described my invention more or less specifically with reference to the structure herein shown, it will be understood that various changes in the details thereof may be effected and that other methods of assembly of the components to function as described, in attaining the objectives of my invention may be made, within the spirit and scope of my invention, as defined by the following claims.

I claim:

1. In combination with a machine for necking sliders for separable fasteners, a mechanism for feeding the sliders to the work-receiving table of said machine, comprising a chute having a slot for the entry of a series of sliders therein, with their lugs located within said slot, a rigid vertical support in spaced relation to the slotted portion of said chute embodying sets of bearings on either side of the median line of said support, a slide reciprocable in each set of bearings, means connecting said slides for effecting their conjoint reciprocation in opposite directions, a lever rockably supported from each of said slides, said levers being disposed in alinement with said chute slot, in vertically spaced relation to one another, and spring means connecting the ends of said levers remote from said chute to the respective lever-supporting slides, acting to urge the free ends of said levers into engagement with predetermined sliders in said chute in the reciprocation of said slides in alternate directions to control the advancement of the sliders to the lowermost position in said chute and the delivery of a slider from the lowermost position to said table.

2. In combination with a machine for necking sliders for separable fasteners, a mechanism for feeding the sliders to the work-receiving table of said machine, comprising a chute having a slot for the entry of a series of sliders therein, with their lugs located within said slot, a rigid vertical support in spaced relation to the slotted portion of said chute embodying sets of bearings on either side of the median line of said support, a slide reciprocable in each set of bearings, means connecting said slides for effecting their conjoint reciprocation in opposite directions, a lever rockably supported from each of said slides, said levers being disposed in alinement with said chute slot, in vertically spaced relation to one another, and spring means connecting the ends of said levers remote from said chute to the respective lever-supporting slides, acting to urge the free ends of said levers into engagement with predetermined sliders in said chute in the reciprocation of said slides in alternate directions to control the advancement of the sliders to the lowermost position in said chute and the delivery of a slider from the lowermost position to said table; a plate slidably mounted for movement in a horizontal plane between said levers, having a portion adapted to engage the sliders traversing said chute and spring means connected to said plate adjustable to vary the degree of yieldability of said plate, for controlling the movement of the sliders engaging therewith.

3. In combination with a machine for necking sliders for separable fasteners, a mechanism for feeding the sliders to the work-receiving table of said machine, comprising a chute having a slot for the entry of a series of sliders therein, with their lugs located within said slot, a rigid vertical support in spaced relation to the slotted portion of said chute embodying sets of bearings on either side of the median line of said support, a slide reciprocable in each set of bearings, means connecting said slides for effecting their conjoint reciprocation in opposed directions, a lever rockably supported from each of said slides, said levers being disposed in alinement with said chute slot, in vertically spaced relation to one another, and spring means connecting the ends of said levers remote from said chute to the respective lever-supporting slides, acting to urge the free ends of said levers into engagement with predetermined sliders in said chute in the reciprocation of said slides in alternate directions to control the advancement of the sliders to the lowermost position in said chute and the delivery of a slider from the lowermost position to said table; and spring actuated means engageable with the sliders in said chute in a zone intermediate the two levers, for detecting non-uniformities in the sliders issuing through said chute, said means being adapted for predetermined adjustment to react to a non-uniform slider to arrest the movement of such slider through said chute.

4. In a machine for deforming the neck of a slider for slide fasteners to produce a V-shaped reinforcement between the wings of the slider, means for supporting a slider and defining a final die position, means for delivering a slider above the final die position, a vertically reciprocable head assembly carrying a male die mounted above and aligned with said slider-supporting means defining the final die position, means suspended from said head assembly for relative vertical movement, means for actuating said head assembly, elements slidably mounted in said means suspended from the head assembly in laterally spaced relation to the male die dependent therebetween, said elements being engageable with a slider delivered above the final die position in the descending movement of said head assembly to locate the slider in engagement with said supporting means at the final die position, in advance of the engagement of the slider by said male die, means moving with said head assembly having cam surfaces formed to engage said elements in the downward movement of said head assembly relative to said means suspended from said head assembly when said elements are engaged with the slider in the final die position to urge said elements into coacting engagement with opposite neck surfaces of the supported slider to coact with the male die in the formation of the reinforcement, the surfaces of said elements engaged with the slider being conformed to cooperate with the opposed workentering surfaces of said male die to define the shape of the reinforcement, and locking means supported from said means suspended from said head assembly adapted to engage said elements when urged into engagement with the slider to maintain said elements in slider-gripping position to lift the slider from said die position, in the upward movement of said means suspended from the head assembly in vertically spaced relation to the ascending head assembly, said locking means being actuatable in a further stage of the ascending movement of said means suspended from the head assembly to release said elements for movement from their slider-gripping position for the discharge of the work therefrom.

5. In a machine for deforming the neck of a slider for slide fasteners, to produce a reinforcing surface therein between the slider wings, a table mounted for opposite directional movement in a horizontal plane, said table being provided with an adjustable slider-receiving slot intermediate its ends, means for feeding a slider to said slot, a vertically reciprocable head assembly carrying a slider deforming male die supported above said table, means below said table for engaging and supporting a slider for the performance of the deforming operation by the male die in its terminal downward movement and defining the final die position, mechanism for actuating said head assembly and said table in timed relation to alternately locate said slot in registration with said slider-feeding means and with said final die position, the table-actuating mechanism including means for adjusting said slot to the thickness of a slider entered therein and means to permit the table to dwell when the said slot is at the slider-feeding and final die positions, and expand said slot at each of said positions, said slider-receiving slot being in registration with said slider-feeding means when said head assembly is in raised position, the table being moved in the direction of the final die position in the descent of said head assembly to aline said slider-receiving slot with said slider-supporting means in the final die position for transfer of the slider thereto from the expanded slot, and elements associated with said head assembly movable in the descent of said head assembly to a position to engage the slider in the expanded slot and transfer it into the final die position, in advance of the downward progression of the male die to slider-engaging position, said elements embodying surfaces formed for engaging neck portions of the supported slider, and means moving with said head assembly for actuating said elements to engage their aforesaid surfaces with such neck portions of the slider, as the male die impinges upon the slider, said element surfaces coacting with said die in the deformation of the slider neck in response to the die pressure, means for locking said elements in slider-gripping position whereby said elements will function to withdraw the work from the supporting means at the die position, through said expanded slot, following the formation of the reinforcement, in response to the upward movement of said head assembly, said elements being actuatable at a predetermined point in such upward movement to release the slider, the movement of said table to relocate the slider-receiving slot in registration with the slider-feeding means being initiated as the slider moving upwardly with said elements clears said slider-receiving slot.

6. In a machine for deforming the neck of a slider for slide fasteners to produce a V-shaped reinforcement between the wings thereof, a longitudinally reciprocable slider conveyor, means for feeding a slider to the conveyor, a vertically reciprocable head assembly mounted above the conveyor and carrying a depending male die, means constituting a cooperating die for supporting a slider for engagement by said male die said cooperating die being disposed below the conveyor in alignment with the male die and defining a final die position, means for actuating said head assembly for vertical movement towards and from the final die position and said conveyor for longitudinal movement between said slider feeding means and the final die position in timed relation, elements suspended from said head assembly for vertical movement in the same direction and for longitudinal movement in opposing directions, said elements being engageable with surfaces of the slider in the initial descending movement of said head assembly to displace the slider from the conveyor into the final die position, in advance of the engagement of the slider by the male die and means for oppositely actuating said elements into engagement with the neck of the supported slider as the male die impinges upon the slider in the terminal descending movement of the head assembly, said elements functioning to support said neck surface in opposition to the descending male die and cooperating therewith in the formation of the neck reinforcement.

7. In a machine for deforming the neck of a slider for slide fasteners to produce a V-shaped reinforcement between the wings thereof, a longitudinally reciprocable slider conveyor, means for feeding a slider to the conveyor, a vertically reciprocable head assembly mounted above the conveyor and carrying a depending male die, means constituting a cooperating die for supporting a slider for engagement by said male die, said cooperating die being disposed below the conveyor in alignment with the male die and defining a final die position, means for actuating said head assembly for movement towards and from the final die position and said conveyor for movement between said slider feeding means and the final die position in timed relation, the conveyor-actuating means periodically becoming non-effective relation to said conveyor to permit said conveyor to dwell upon delivery of slider above the final die position as the head assembly descends towards the final die position, elements suspended from said head assembly for vertical movement in the same direction and for longitudinal movement in opposing directions, said elements being engageable with surfaces of the slider in the initial descending movement of said head assembly to displace the slider from the conveyor into the final die position, in advance of the engagement of the slider by the male die and means for oppositely actuating said elements into engagement with the neck of the supported slider as the male die impinges upon the slider in the terminal descending movement of the head assembly, said elements functioning to support said neck surface in opposition to the descending male die and cooperating therewith in the formation of the neck reinforcement.

8. In a machine for deforming the neck of a slider for slide fasteners to produce a V-shaped reinforcement between the wings thereof, a longitudinally reciprocal slider conveyor, means for feeding a slider to the conveyor, a vertically reciprocable head assembly mounted above the conveyor and carrying a male die, means constituting a cooperating die for supporting a slider for engagement by said male die thereof, said cooperating die being disposed below the conveyor in alignment with the male die and defining a final die position, means for actuating said head assembly for movement towards and from the final die position, and said conveyor for movement between said slider feeding means and said final die position in timed relation, the conveyor-actuating means periodically becoming non-effective relative to said conveyor to permit said conveyor to dwell upon delivery of the slider above the final die position as the head assembly descends towards the final die position, elements suspended from said head assembly for relative vertical movement in the same direction and for longitudinal movement in opposing directions, said elements being engageable with wing surfaces of a slider in the initial descending movement of said head assembly to displace the slider from said conveyor into said final die position, in advance of the engagement of the slider by the male die, and means for oppositely later actuating said elements into engagement with the neck of the supported slider as the male die impinges thereon, said elements functioning to support the neck surface in opposition to the descending male die and cooperating therewith in defining the neck reinforcement, means for locking said elements in engagement with the slider, said locking means maintaining said elements in gripping engagement with the slider to lift the deformed slider from said final die position in response to the upward movement of said head assembly, means for actuating said locking devices at a predetermined point in the upward movement of said head assembly to render them non-effective and means effective on said elements to actuate them to release the lifted slider for transfer from said machine.

9. In a machine for deforming the neck of a slider for slide fasteners to produce a V-shaped reinforcement between the wings thereof, a vertically reciprocable head assembly carrying a depending male die, means constituting a cooperating die in alignment with said male die for supporting a delivered slider for engagement by said male die, said cooperating die being disposed in alignment with said male die and defining a final die position, means for delivering a slider above and in alignment with the final die position, means for actuating said head assembly for descending movement, elements suspended from said head assembly in laterally spaced relation to the depending male die for relative vertical movement in the same direction and for longitudinal movement in opposing directions, said elements in the initial descending movement of said head assembly being engageable with surfaces of the slider delivered above the final die position to enter the slider in the final die position in advance of the engagement of the slider by said male die, and means moving with said head assembly having surfaces for engaging said elements to oppositely actuate them into juxtaposition beneath the neck of the slider entered in the die position, in the ensuing downward progression of the head assembly to bring the male die carried thereby into contact with the slider, whereby said elements support opposite neck surfaces of the slider for the entry of the male die therebetween in the formation of the reinforcement, said elements being conformed to cooperate with said male die in defining the shape of the reinforcement.

10. In a machine for deforming the neck of a slider for slide fasteners to produce a reinforcement between the wings thereof, a vertically reciprocable head assembly carrying a depending male die, means constituting a cooperating die in alignment with said male die for supporting a delivered slider for engagement by said male die, said cooperating die being disposed in alignment with said male die and defining the final die position, means for delivering a slider above and in alignment with the final die position, means for actuating said head assembly, elements suspended from the head assembly, in laterally spaced relation to the male die, for relative vertical movement in the same direction and for longitudinal movement in opposing directions, said elements being actuable into engagement with a slider delivered above the final die position in the decending movement of said head assembly to locate the slider in the final die position in advance of the engagement of the slider by said male die, means moving with said head assembly having cam surfaces formed to engage said elements in the downward movement of said head assembly relative to said elements when the slider is located in the die position to urge said elements into juxta-position in engagement with the opposite neck surface of the supported slider to coact with the male die in the formation of the reinforcement, the surfaces of said elements engaged with the slider being conformed to cooperate with the opposed work-entering surfaces of said male die to refine the shape of the reinforcement.

11. In a machine for deforming the neck of a slider for slide fasteners to produce a reinforcement between the wings thereof, a vertically reciprocable head assembly carrying a depending male die, means constituting a cooperating die in alignment with said male die for supporting a delivered slider for engagement by said male die said cooperating die being disposed in alignment with said male die and defining the final die position, means for delivering a slider above and in alignment with the final die position, elements suspended from said head assembly in laterally spaced relation to the male die for relative movement in the same direction and for movement in opposing directions, said elements being actuable to engage a slider delivered above the final die position in the initial downward movement of the head assembly towards the final die position to enter the slider into said final die position, in advance of the progression of the male die to slider-engaging position, additional means for laterally supporting the slider in the final die position including a slidable member actuatable in response to the descending movement of said head assembly, and means moving with said head assembly having surfaces formed to engage said elements to oppositely and longitudinally displace them into engagement with opposite neck portions of the slider, the slider-engaging surfaces of said elements being conformed to cooperate with the opposed work-entering surfaces of said male die to define the shape of the reinforcement.

12. In a machine for deforming the neck of a slider for slide fasteners, to produce a reinforcing surface therein between the slider wings, a table mounted for longitudinal reciprocation, said table being provided with a slider-receiving slot intermediate its ends, means for feeding a slider to said slot, a vertically reciprocable head assembly carrying a male die supported above said table, means below the table constituting a cooperating die for supporting a delivered slider for engagement by said male die, said cooperating die being disposed in alignment with the male die and defining a final die position, mechanism for actuating said head assembly and said table in timed relation to alternately locate said slot in registration with said slider-feeding means and with said final die position, the table-actuating means of said mechanism including lost motion connections to permit the table to dwell when the slider-receiving slot thereof is at the slider-feeding and final die positions, said slider-receiving slot being in registration with said slider-feeding means when said head assembly is in raised position, the table moving in the direction of the final die position during the initial descending movement of said head assembly to aline said slider-receiving slot with said slider-supporting means at the final die position for transfer of the slider thereto from said slot, and elements associated with said head assembly mounted for relative vertical movement in the same direction and longitudinal movement in opposing directions, said elements being movable in the continued descending movement of said head assembly to engage and displace the slider from said table slot into said final die position, in advance of the downward progression of the male die to slider-engaging position, said elements embodying surfaces formed for engaging neck portions of the supported slider, and means moving with said head assembly for further actuating said elements to engage their aforesaid surfaces beneath such neck portions of the slider, as the male die in its terminal descending movement impinges upon the slider, whereby said surfaces will coact with said male die in the deformation of the slider neck in response to the male die pressure.

13. A machine for deforming the neck of a slider for slider fasteners, to produce a reinforcing surface therein between the slider wings, including a table mounted for longitudinal reciprocation, said table being provided with an adjustable slider-receiving slot intermediate its ends, means for feeding a slider to said slot, a vertically reciprocable head assembly carrying a male die supported above said table, means below the table constituting a cooperating die for supporting a delivered slider for engagement by said male die, said cooperating die being disposed in alignment with the male die and defining a final die position, mechanism for actuating said head assembly and said table in timed relation to alternately locate said slot in registration with said slider feeding means and with said final die position, the table-actuating mechanism including means for adjusting said slot to the thickness of a slider entered therein and means to permit the table to dwell when the said slot is at the slider delivery and final die positions and to expand said slot at each of said positions, said slider-receiving slot being in registration with said slider-delivery means when said head assembly is in raised position, the table being moved in the direction of the final die position during the initial descending movement of said head assembly to aline said slider-receiving slot with said slider-maintained means in the final die position for transfer of the slider thereto from the expanded slot, and elements associated with said head assembly mounted for relative vertical movement in the same direction and longitudinal movement in opposing direction, said element being movable in the continued descending movement of said head assembly to engage the slider in the expanded slot and transfer the same into the final die position, in advance of the downward progression of the male die to slider-engaging position, said elements embodying surfaces formed for engaging neck portions of the supported slider, and means moving with said head assembly for actuating said elements to engage their aforesaid surfaces with such neck portions of the slider, as the male die in its terminal descending movement impinges upon the slider, said element surfaces coacting with said male die in the deformation of the slider neck in response to the die pressure.

14. In a machine for deforming the neck of a slider for slide fasteners to produce a reinforcement between the wings thereof, a longitudinally reciprocable slider-conveying table, means for feeding a slider to the table, a vertically reciprocable head assembly carrying a male die mounted above said table, means below the table constituting a cooperating die for supporting a conveyed slider for engagement by said male die in the terminal descending movement of the latter, said cooperating die being disposed in alignment with the male die and defining a final die position, means for actuating the said head assembly for descending movement towards the final die position and said table for longitudinal movement between said slider-feeding means and said final die position in timed relation, the table-actuating means periodically becoming non-effective relative to said table to permit said table to dwell at the final die position, and means associated with said head assembly successively operable in response to the continued descending movement of said head assembly when the conveyed slider is in alignment with the final die position in a vertical movement to engage the slider and effect its transfer from said table to the final die position, said latter means in a longitudinal movement being juxtaposed beneath the neck of the slider to cooperate with said male die for defining the shape of the surface produced under the neck-deforming pressure of the male die.

15. A machine for deforming the neck of a slider for slide fasteners to produce a reinforcement between the wings thereof, including a longitudinally reciprocal slider table, means for feeding a slider to the table, a vertically reciprocable head assembly carrying a male die mounted above said table, means below the table constituting a cooperating die for supporting a delivered slider for engagement by said male die in the terminal descending movement of the latter, said cooperating die being disposed in alignment with the male die and defining a final die position, means for actuating the said head assembly for descending movement towards the final die position and said table for longitudinal movement between said slider-feeding means and said final die position, to locate the slider in alignment with the final die position in timed relation and means associated with said head assembly operable in response to the continued descending movement of said head assembly, to move into engagement with the aligned slider and effect its transfer from said table to said die position, said latter means, in the terminal descending movement of the head assembly being moved into juxtaposition beneath the neck of the slider to cooperate with said male die for defining the shape of the surface produced under the neck-deforming pressure of the male die.

16. In a machine for deforming the neck of a slider for slide fasteners to produce a V-shaped reinforcement between the wings thereof, a longitudinally reciprocable slider conveyor, means for feeding a slider to the conveyor, a vertically reciprocable head assembly mounted above the conveyor and carrying a depending male die, means constituting a cooperating die for supporting a delivered slider for engagement by said male die, said cooperating die being disposed in alignment with the male die and defining a final die position, means for moving said conveyor to deliver the slider to the final die position, means for moving said head assembly towards the final die position, and devices associated with said head assembly, operable in response to the movement thereof towards the final die position to engage the neck of the slider delivered at the final die position and to cooperate with said male die in defining the shape of the surface produced under the neck-deforming pressure of said male die.

17. In a machine for deforming the neck of a slider for slide fasteners to produce a reinforcement between the wings thereof, a longitudinally reciprocable slider-conveying table, means for feeding a slider to the table, a vertically reciprocable head assembly including a depending male die and elements laterally disposed with respect to the male die, said elements being successively actuable in the same direction with and in opposite directions relative to one another and the head assembly and adapted to form a cooperating die with said male die at the terminal descending movement thereof, means for moving said head assembly and said table in timed relation whereby the slider is conveyed into alignment with said male die during the initial descending movement of the head assembly said elements in the further descending movement of the said head assembly being engaged in juxtaposition beneath the neck of the aligned slider to support the same in opposition to the descending male die, for the formation of a reinforcement.

18. In a machine for deforming the neck of a slider for slide fasteners to produce a reinforcing surface between the slider wings, a reciprocable head assembly carrying a male die elements mounted on said head assembly and successively actuable together, in the same and opposite directions, means for delivering a slider below said male die, means for moving said head assembly towards the delivered slider and means operable on said elements for displacing said elements in sequence as the head assembly descends towards said delivered slider, to locate the delivered slider in alignment for engagement by the male die and to locate said elements in juxtaposed relation beneath the neck of the slider, whereby said elements during the terminal movement of the head assembly support the neck of the slider in opposition to the deforming pressure of the male die for defining the contour of the reinforcement.

19. In a machine for deforming the neck of a slider for slide fasteners to produce a reinforcement between the wings thereof a fixedly disposed die for supporting a slider and defining a final die position, means for aligning a slider with said final die position, a vertically reciprocable head assembly mounted above the final die position, including a male die cooperating with said fixed die and elements actuatable in response to the movement of said head assembly for cooperating with the slider, and means for moving said head assembly towards the final die position and to function said elements initially to displace the slider from the slider-aligning means into said final die position and thereafter to locate said elements to juxtaposition beneath the neck of the slider as the head assembly descends, said elements, at the termination of their movement, cooperating to support the neck of the slider in opposition to the deforming pressure of the impinging male die in the terminal descending movement of said head assembly, said male die and said elements coacting to define the contour of the reinforcement.

20. In a machine for deforming the neck of a slider for slide fasteners to produce a reinforcement between the wings thereof, a slider delivery chute defining a slider feeding position, a fixedly disposed die for supporting a slider and defining a final die position, slider conveying means mounted above said final die position and comprising reciprocable slides associated for relative and conjoint movement, means for conjointly actuating said slides to the slider-feeding position, means for effecting relative movement of said slides to grip a slider therebetween for progression therewith in their conjoint movement, to a position in alignment with said final die position, a vertically reciprocable head assembly aligned with said die position and including a depending male die for cooperating with said fixed die and movable elements for cooperating with the aligned slider during the descent of the head assembly, means for moving said head assembly towards the final die position, said elements being movable in the same direction in response to the initial downward movement of said head assembly to displace the slider from said slider-conveying means into the final die position, and in opposite directions, in a continuing downward movement of said head assembly, to be juxtaposed beneath the neck of the slider, thereby to cooperate at the termination of their movement in supporting the neck of the slider in opposition to the impinging pressure of the male die in the terminal downward movement of the head assembly for the formation of the aforesaid reinforcement.

BIRDSALL P. LAWSON.